United States Patent
Sandridge

(10) Patent No.: US 10,915,942 B2
(45) Date of Patent: *Feb. 9, 2021

(54) METHOD, APPARATUS, AND COMPUTER READABLE MEDIUM FOR PROVIDING A DIGITAL UNWRAPPING TRIGGER

(71) Applicant: Groupon, Inc., Chicago, IL (US)

(72) Inventor: Jonathan Gray Sandridge, Palo Alto, CA (US)

(73) Assignee: Groupon, Inc., Chicago, IL (US)

(*) Notice: Subject to any disclaimer, the term of this patent is extended or adjusted under 35 U.S.C. 154(b) by 203 days.

This patent is subject to a terminal disclaimer.

(21) Appl. No.: 16/127,341

(22) Filed: Sep. 11, 2018

(65) Prior Publication Data

US 2019/0095980 A1  Mar. 28, 2019

Related U.S. Application Data

(63) Continuation of application No. 13/783,503, filed on Mar. 4, 2013, now Pat. No. 10,096,056.

(51) Int. Cl.
*G06Q 30/00* (2012.01)
*G06Q 30/06* (2012.01)

(52) U.S. Cl.
CPC .................. *G06Q 30/0633* (2013.01)

(58) Field of Classification Search
None
See application file for complete search history.

(56) References Cited

U.S. PATENT DOCUMENTS

| 5,960,411 | A | 9/1999 | Hartman et al. |
| 9,773,273 | B2 | 9/2017 | Erez et al. |
| 2002/0095345 | A1 | 7/2002 | Panelli et al. |
| 2014/0040059 | A1 | 2/2014 | Barabas et al. |
| 2014/0046794 | A1* | 2/2014 | Vallery .............. G06Q 30/0633 705/26.7 |

OTHER PUBLICATIONS

Gerald L. Lohse et al. "Electronic Shopping", Communications of the ACM, Jul. 1998lvol. 41, No. 7, pp. 81-88. (Year: 1998).

* cited by examiner

*Primary Examiner* — Naeem U Haq
(74) *Attorney, Agent, or Firm* — Alston & Bird LLP

(57) ABSTRACT

Provided herein are systems, methods and computer readable media for facilitating delivery of a digital notification of a physical product to inform a recipient of the identity of the physical product. A digital notification may inform the recipient of the identity of a physical product ordered for the recipient by a sender. A digital unwrapping trigger may be utilized to ensure that the recipient is authorized to view the identity of the digital product. For example, the digital notification may not identify the identity of the physical product until a particular date has passed (e.g., a holiday or birthday), until the recipient performs a certain task, or until the recipient meets a certain goal. In response to the trigger occurring, the digital notification may be enabled for viewing of the identity of the physical product. The physical delivery of the product may be coordinated with delivery of the digital notification.

21 Claims, 4 Drawing Sheets

METHOD, APPARATUS, AND COMPUTER READABLE MEDIUM FOR PROVIDING A DIGITAL UNWRAPPING TRIGGER

This application is a continuation of U.S. application Ser. No. 13/783,503, titled "METHOD, APPARATUS, AND COMPUTER READABLE MEDIUM FOR PROVIDING A DIGITAL UNWRAPPING TRIGGER" filed Mar. 4, 2013, the content of which is incorporated herein by reference in its entirety.

FIELD

Embodiments of the invention relate, generally, to fulfilling product orders and, more particularly, to managing digital notifications of physical good shipments.

BACKGROUND

Merchants sell goods and services (collectively referred to herein as "products") to consumers. The merchants can often control the form of their product offers, the timing of their product offers, and the price at which the products will be offered. The merchant may sell products at a brick-and-mortar sales location, a virtual online site, or both.

Advances in security and accessibility have led to users becoming increasingly comfortable with purchasing products online. By patronizing online retailers, users may make purchasing decisions from the comfort of their own home or office, without the need to physically visit a brick and mortar store. However, brick and mortar stores still offer some advantages over online retailers, particularly with respect to the ability to service the needs of last minute shoppers, as online retailers generally require time to process orders and to pack and ship the product. Since a substantial amount of business derives from these last minute shoppers, online retailers have noted that the ability to provide more robust shipping and delivery options results in a corresponding increase in revenue.

However, advances in the shipping and product supply chain can only go so far to close the gap between online retailers and brick and mortar stores. A substantial amount of shopping often occurs on the day before or the day of gifting days. For example, Christmas Eve is one of the busiest shopping days of the year. Same day delivery is not widely available and most delivery services do not operate on holidays, meaning that shoppers have few online options if they wish to be able to present a gift on the holiday. Similar concerns may exist for other dates, such as birthdays, graduation dates, weddings, and the like. Last minute shoppers typically resort to brick and mortar stores for these occasions rather than risk having no gift to present on the important date.

BRIEF SUMMARY

In general, embodiments of the present invention provided herein include systems, methods and computer readable media for facilitating delivery of a digital notification of a physical product to inform a recipient of the identity of the physical product. For example, provided here is a method for delivering a digital notification to a gift recipient, where the digital notification informs the recipient of the identity of a physical product ordered for the recipient by a sender. A digital unwrapping trigger may be utilized to ensure that the recipient is authorized to view the identity of the digital product. For example, the digital notification may not identify the identity of the physical product until a particular date has passed (e.g., a holiday or birthday), until the recipient performs a certain task, or until the recipient meets a certain goal. In response to the trigger occurring, the digital notification may be enabled to view the identity of the physical product. For example, a hyperlink included in the digital notification may not be valid until the date of a holiday, at which time the content at the address of the link is populated with the identity of a product ordered for the gift recipient.

Example embodiments may include a method for facilitating product delivery. The method may include receiving a purchase order for a physical product, providing a digital notification to a recipient, determining that the recipient has met at least one digital unwrapping trigger, and in response to determining that the recipient has met the digital unwrapping trigger, notifying the recipient of the identity of the physical product using the digital notification. The digital notification may inform the recipient of an identity of the physical product. The digital notification may be provided to the recipient in response to the recipient meeting the at least one digital unwrapping trigger. The digital notification may be provided to the recipient prior to the recipient meeting the at least one digital unwrapping trigger. In some embodiments, the method includes enabling the recipient to use the digital notification to identify the physical product in response to the recipient meeting the at least one digital unwrapping trigger. The method may also include coordinating a physical delivery of the physical product so that the physical delivery occurs after the digital delivery of the digital notification. In yet further embodiments, the method may include receiving an indicator that the recipient has viewed the digital notification, and in response to receiving the indicator, initiating the physical delivery of the physical product. The indicator may be received via selection of a link to electronic content, the link being included within the digital notification. The method may also include modifying the electronic content to identify the identity of the physical product in response to the recipient meeting the gift delivery criterion. The digital unwrapping trigger may be at least one of a date, a time, or an occurrence of an event. Some embodiments of the method may also include receiving the at least one digital unwrapping trigger from a sender who initiated the purchase order.

Example embodiments may further include an apparatus. The apparatus may include a memory coupled to at least one processor, and the at least one processor. The at least one processor may be configured to receive a purchase order for a physical product, provide a digital notification to a recipient, determine that the recipient has met at least one digital unwrapping trigger, and, in response to determining that the recipient has met the digital unwrapping trigger, notify the recipient of the identity of the physical product using the digital notification. The digital notification may inform the recipient of an identity of the physical product. The digital notification may be provided to the recipient in response to the recipient meeting the at least one digital unwrapping trigger. The digital notification may be provided to the recipient prior to the recipient meeting the at least one digital unwrapping trigger. The processor may be further configured to enable the recipient to use the digital notification to identify the physical product in response to the recipient meeting the at least one digital unwrapping trigger. The processor may be further configured to coordinate a physical delivery of the physical product so that the physical delivery occurs after the digital delivery of the digital notification.

Embodiments may provide computer readable storage medium comprising instructions. When executed by a processor, the instructions may cause the processor to receive a purchase order for a physical product, provide a digital notification to a recipient, determine that the recipient has met at least one digital unwrapping trigger; and, in response to determining that the recipient has met the digital unwrapping trigger, notify the recipient of the identity of the physical product using the digital notification. The digital notification may inform the recipient of an identity of the physical product. The digital notification may be provided to the recipient in response to the recipient meeting the at least one digital unwrapping trigger. The digital notification may be provided to the recipient prior to the recipient meeting the at least one digital unwrapping trigger. The computer readable medium may further include instructions to cause the processor to enable the recipient to use the digital notification to identify the physical product in response to the recipient meeting the at least one digital unwrapping trigger. The computer readable medium may also include instructions causing the processor to coordinate a physical delivery of the physical product so that the physical delivery occurs after the digital delivery of the digital notification.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

Figure 3:
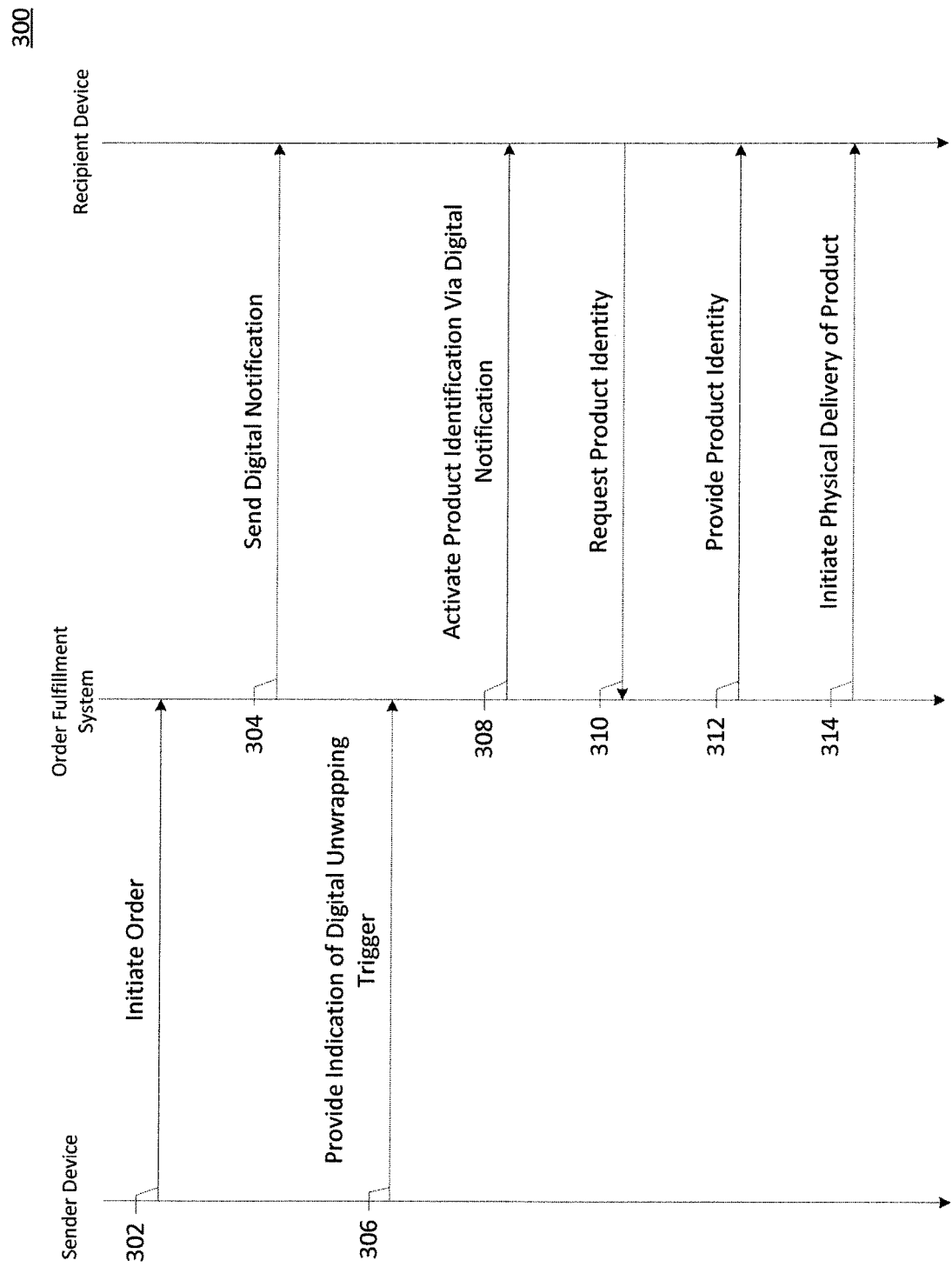
Figure 4:
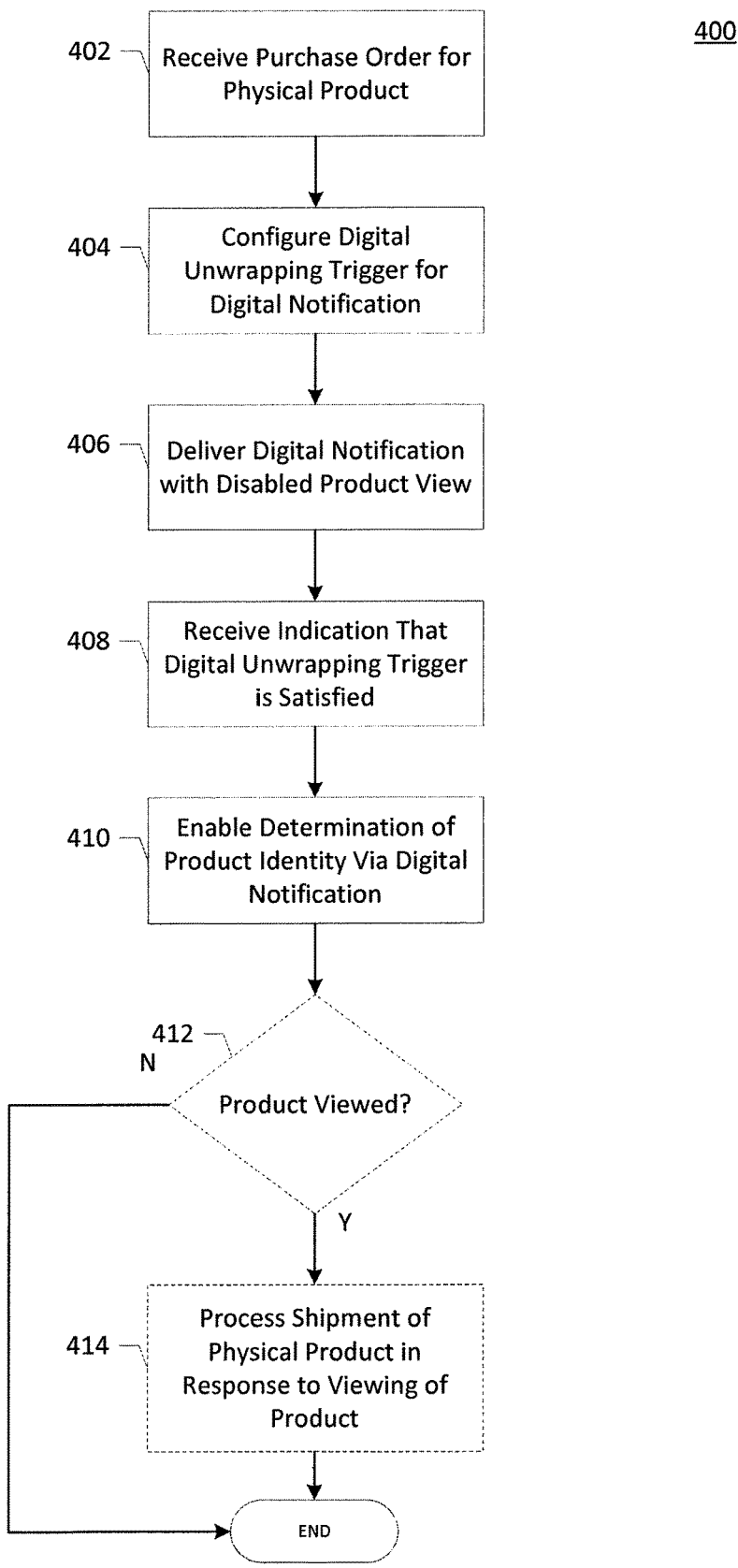

FIG. 3 depicts a signaling diagram of an example of a message flow among a sender device, an order fulfillment system, and a recipient device in accordance with some embodiments discussed herein; and FIG. 4 depicts a flow chart showing an example of a process for enabling identification of a product using a digital unwrapping trigger to enable a digital notification in accordance with some embodiments discussed herein.

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Figure 1:
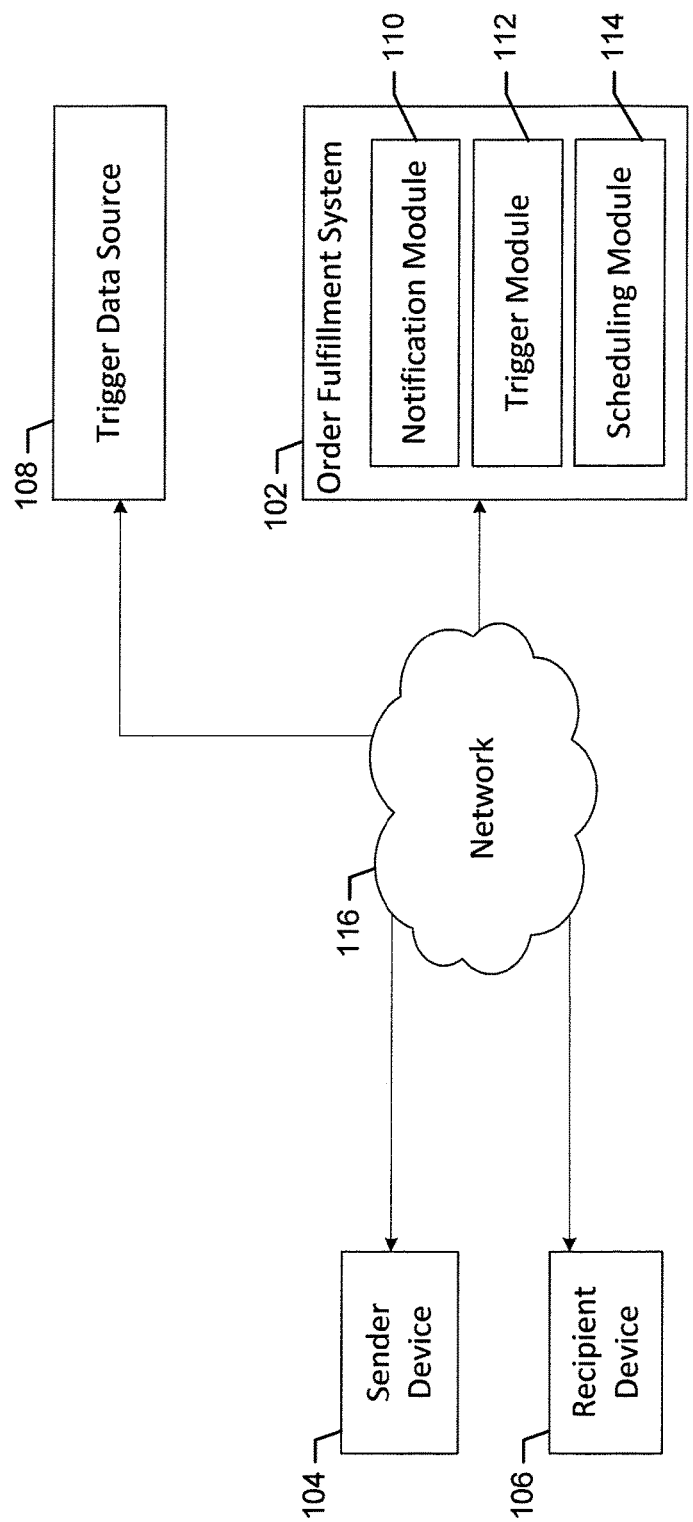
FIG. 1 depicts an example of a system in accordance with some embodiments discussed herein.

FIG. 1 depicts a system 100 which includes an example of a network architecture for a system in accordance with some embodiments discussed herein. The system 100 may include one or more devices and sub-systems that are configured to implement some embodiments as discussed herein. For example, the system 100 may include an order fulfillment system 102. The order fulfillment system 102 may communicate with a sender device 104, a recipient device 106, and a trigger data source 108 to provide digital notifications of physical product delivery in accordance with embodiments of the invention.

The sender device 104 and the recipient device 106 may be computing devices, such as desktop computers, laptop computers, personal digital assistants, smartphones, cellular phones, netbook computers, or any other device operable to place product orders or receive digital notifications.

The order fulfillment system 102 may function as a host or server computer to provide for accepting or generating product orders. In some embodiments, the order fulfillment system 102 may be configured to receive product orders via a web interface, such as an e-commerce website. The order fulfillment system 102 may comprise a notification module 110, a trigger module 112, and a scheduling module 114. Each of the modules 110, 112, 114 may be implemented as hardware, software, or a combination of the two as described below with respect to FIG. 2.

The notification module 110 may function to generate one or more digital notifications in response to receiving a product order from a sender device, such as the sender device 104. For example, the notification module 110 may generate a message to a recipient device 106, indicating that a sender has initiated a delivery of a physical product to the recipient. The message generated by the notification module 110 may be in the form of an e-mail, a short messaging service (SMS) message, a social media message, or any other digital format message addressed to the recipient. Although the digital notification may function to inform the recipient that the sender has arranged for the recipient to receive a particular product, the digital notification may not initially provide the recipient with the identity of the product. For example, the digital notification may be provided to the recipient with a link that is not enabled until a particular digital unwrapping trigger has been met. In this manner, the digital notification may notify the recipient of the gift that a gift has been arranged, but withhold providing the identity of the gift until the digital wrapping criteria has occurred, thus allowing the sender of the gift to control the circumstances under which the recipient discovers the gift that the recipient will receive. Furthermore, digital unwrapping of a product may provide the same or a similar user experience to traditional "physical" unwrapping (e.g., removing wrapping paper from a physical package), but at significantly reduced cost and effort.

The digital unwrapping trigger may be managed by the trigger module 112. The order fulfillment system 102 may receive the digital unwrapping trigger from the sender at the time the order is placed. For example, a sender may specify a particular time, date, or other event to control when the recipient may determine the identity of the product via the digital notification. The trigger module 112 may operate to receive data from a trigger data source 108 and, in response to verification of the digital unwrapping trigger having been met, enable viewing of the product via the digital notification. For example, the trigger module 112 may enable viewing of the product by altering content at a network location (e.g., a website) pointed to by a link in a digital notification such that the content informs a recipient that visits the network location of the identity of the product after the digital unwrapping trigger have been met.

The trigger data source 108 may provide data to the order fulfillment system 102 to allow the order fulfillment system 102 to determine whether the digital unwrapping trigger have been met. The trigger data source 108 may include an interface that provides information to the order fulfillment system, such as date and time information, or any other information which may be used as a trigger to enable the recipient to view the identity of the product via the digital notification, such as an internal module or an external system located at another computing node. For example, the trigger data source 108 may be a calendar module, a network time source, a fitness log website, a school grade website, or any other service for providing data that may be used to determine whether digital unwrapping trigger have been met.

The scheduling module 114 may function to arrange for scheduling of digital notifications and physical deliveries of product orders placed via the sender device 104. For example, the scheduling module 114 may operate to determine whether the recipient has viewed the identity of the product via the digital notification and, in response to determining that the recipient has viewed the product identity, arrange for shipment of the physical product. The scheduling module 114 may also control delivery of the digital notification, such that the digital notification arrives at a particular time or on a particular day. In this manner, the scheduling module 114 may ensure that the digital notification is sent to the recipient prior to the recipient receiving the physical product.

The order fulfillment system 102, the sender device 104, the recipient device 106, and the trigger data source 108 may communicate with one another via a network 116. The network 116 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the network 116 may include a cellular telephone, an 802.11, 802.16, 802.20, and/or WiMax network. Further, the network 116 may include a public network, such as the Internet, a private network, such as an intranet, or combinations thereof, and may utilize a variety of networking protocols now available or later developed including, but not limited to TCP/IP based networking protocols.

Figure 2:
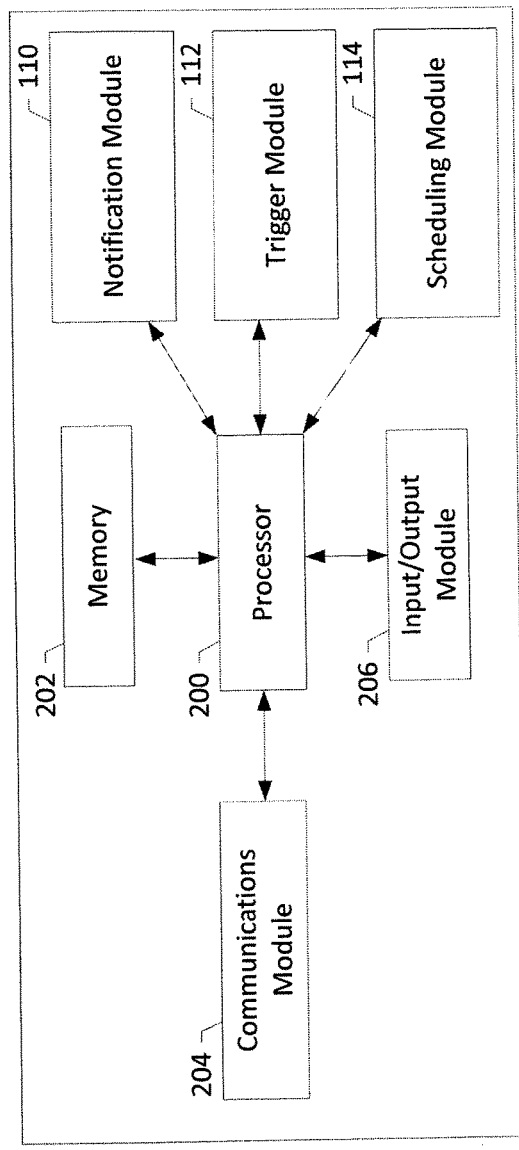
FIG. 2 depicts a schematic block diagram of an example of circuitry that can be included in a computing device, such as an order fulfillment system, in accordance with some embodiments discussed herein.

FIG. 2 shows a block diagram of example circuitry that may be included in the order fulfillment system 102, which may be configured to perform the analysis, management and/or other functionality discussed in connection with the order fulfillment system 102 described with respect to FIG. 1. As illustrated in FIG. 2 and in accordance with some example embodiments, the order fulfillment system 102 may include various means, such as a processor 200, a memory 202, a communications module 204, an input/output module 206, a notification module 110, a trigger module 112, and a scheduling module 114.

The processor 200 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments, the processor 200 comprises a plurality of processors. The plurality of processors may be embodied on a single computing device or may be distributed across a plurality of computing devices collectively configured to function as circuitry. The plurality of processors may be in operative communication with one another and may be collectively configured to perform one or more functionalities of the order fulfillment system 102 as described herein. In an example embodiment, the processor 200 is configured to execute instructions stored in the memory 202 or otherwise accessible to the processor 200. These instructions, when executed by the processor 200, may cause the order fulfillment system 102 to perform one or more of the functionalities as described herein.

Whether configured by hardware, firmware/software methods, or by a combination thereof, the processor 200 may comprise an entity capable of performing operations according to embodiments of the present invention while configured accordingly. Thus, for example, when the processor 200 is embodied as an ASIC, FPGA or the like, the processor 200 may comprise specifically configured hardware for conducting one or more operations described herein. Alternatively, as another example, when the processor 200 is embodied as an executor of instructions, such as may be stored in the memory 202, the instructions may specifically configure the processor 200 to perform one or more algorithms and operations described herein, such as those described with respect to FIGS. 3-5.

The memory 202 may comprise, for example, volatile memory, non-volatile memory, or some combination thereof. Although illustrated in FIG. 2 as a single memory, the memory 202 may comprise a plurality of memory components. The plurality of memory components may be embodied on a single computing device or distributed across a plurality of computing devices. In various embodiments, the memory 202 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 202 may be configured to store information, data (including deal parameter data and/or analytics data), applications, instructions, or the like for enabling the order fulfillment system 102 to carry out various functions in accordance with example embodiments of the present invention. For example, in at least some embodiments, the memory 202 is configured to buffer input data for processing by the processor 200. Additionally or alternatively, in at least some embodiments, the memory 202 is configured to store program instructions for execution by the processor 200. The memory 202 may store information in the form of static and/or dynamic information. This stored information may be stored and/or used by the order fulfillment system 102 during the course of performing its functionalities.

The communications module 204 may be embodied as any device or means embodied in circuitry, hardware, a computer program product comprising computer readable program instructions stored on a computer readable medium (e.g., the memory 202) and executed by a processing device (e.g., the processor 200), or a combination thereof that is configured to receive and/or transmit data from/to another device, such as, for example, the sender device 104, the recipient device 106, the trigger data source 108, and/or the like. In some embodiments, the communications module 204 (like other components discussed herein) can be at least partially embodied as or otherwise controlled by the processor 200. In this regard, the communications module 204 may be in communication with the processor 200, such as via a bus. The communications module 204 may include, for example, an antenna, a transmitter, a receiver, a transceiver, network interface card and/or supporting hardware and/or firmware/software for enabling communications with another computing device. The communications module 204 may be configured to receive and/or transmit any data that may be stored by the memory 202 using any protocol that may be used for communications between computing devices. The communications module 204 may additionally or alternatively be in communication with the memory 202, the input/output module 206 and/or any other component of the order fulfillment system 102, such as via a bus.

The input/output module 206 may be in communication with the processor 200 to receive an indication of a user input and/or to provide an audible, visual, mechanical, or other output to a user (e.g., a promotional system administrator and/or cloud computer programmer). As such, the input/output module 206 may include support, for example, for a keyboard, a mouse, a joystick, a display, a touch screen display, a microphone, a speaker, a RFID reader, barcode reader, biometric scanner, and/or other input/output mechanisms. In embodiments wherein the order fulfillment system 102 is embodied as a server, aspects of the input/output module 206 may be reduced as compared to embodiments where the order fulfillment system 102 is implemented as an end-user machine (e.g., consumer device and/or merchant device) or other type of device designed for complex user interactions. In some embodiments (like other components discussed herein), the input/output module 206 may even be eliminated from the order fulfillment system 102. The input/output module 206 may be in communication with the memory 202, the communications module 204, and/or any other component(s), such as via a bus. Although more than one input/output module and/or other component can be included in the order fulfillment system 102, only one is shown in FIG. 2 to avoid overcomplicating the drawing (like the other components discussed herein).

The notification module 110, the trigger module 112, and the scheduling module 114 may also be included and configured to provide digital notifications to recipients of physical products as described above with respect to FIG. 1. In some embodiments, some or all of the functionality of providing digital notification to recipients of physical products may be performed by processor 200. In this regard, the example processes and algorithms discussed herein can be performed by at least one processor 200. For example, non-transitory computer readable media can be configured to store firmware, one or more application programs, and/or other software, which include instructions and other computer-readable program code portions that can be executed to control each processor (e.g., the processor 200) of the components of the order fulfillment system 102 to implement various operations, including the examples shown above. As such, a series of computer-readable program code portions are embodied in one or more computer program products and can be used, with a computing device, server, and/or other programmable apparatus, to produce machine-implemented processes.

FIG. 3 depicts a signaling diagram showing message flow 300 among a sender device, an order fulfillment system, and a recipient device in accordance with some example embodiments. The message flow 300 describes the process by which a sender device may initiate an order with an order fulfillment system for delivery to a recipient. The order fulfillment system may provide a digital notification to the recipient device, and, in response to meeting certain digital unwrapping trigger, enable the recipient device to determine the identity of the product using the digital notification. Although the instant example relates to delivery of a single product, additional or alternative embodiments may relate to the delivery or notification of multiple products. For example, several products may be delivered or revealed, with a final reveal of a last product. These products may be revealed in a particular order, such that products revealed later are progressively larger or more expensive.

At action 302, a sender device, such as the sender device 104 initiates an order with an order fulfillment system, such as the order fulfillment system 102. The initiation of the order may include providing shipping, payment, and digital unwrapping trigger via an e-commerce interface, such as a website. The sender device may specify a particular product, an address to which the product should be delivered, a digital notification address (e.g., an e-mail, a social network identifier, or a cellular phone number), and a digital unwrapping trigger, where the digital unwrapping trigger specifies one or more conditions that will result in the recipient of the digital notification being enabled to view the identity of the product. For the purposes of this disclosure, the term "identity of the product" is understood to mean information such that the recipient of the digital notification is able to determine which product has been ordered by the sender. This identity may include a product name, a product model number, an image of a product, or any other information such that the recipient may be informed of which product has been ordered by the sender.

At action 304, a digital notification is sent to the recipient device by the order fulfillment system. The digital notification may be sent according to a particular schedule. For example, the sender may specify that the digital notification should be sent on a particular date, day, or at a particular time. As a specific example, the sender may indicate that the order is intended as a Christmas present, and that the digital notification should not be sent to the recipient until Christmas morning.

The digital notification may also inform the recipient that a product has been ordered by the sender for the recipient. In some embodiments, the digital notification may include information identifying the particular criteria that will satisfy digital unwrapping trigger and provide the recipient with the identity of the product. For example, the digital notification may provide a hyperlink, along with a message to "Click this link on Christmas morning to view your present!", or "Click this link after achieving a 3.0 grade point average to receive your gift!" The digital notification may also identify the sender. In some embodiments, the digital notification may include a particular user identifier, such as a unique code or login credentials. The unique code or login credentials may enable the user to access a website maintained by the order fulfillment system such that the credentials or code will not function until the digital unwrapping trigger has occurred. In some embodiments, the digital notification may not include a digital unwrapping trigger, and may directly identify the product without requiring satisfaction of additional criteria.

In yet further embodiments, the digital notification may provide an interface to simulate unwrapping of a physical product. For example, a graphical user interface may display an image of a wrapped present, and provide an interface for using a mouse cursor to remove the virtual wrapping paper to view an image or description of the product underneath the virtual wrapping paper. In some embodiments, the user interface may include audio and visual effects to provide a "reveal" or "unwrapping" of the product. In some embodiments, the display of the product may be related to progress towards the unwrapping trigger such that the interface may progressively show portions of the product as the recipient progresses toward the trigger. For example, the interface may reveal portions of the product as a teaser as a date gets closer (for example, using an algorithm to show a pixelated version but not enough to identify), or as the recipient completes certain milestones to advance towards the unwrapping trigger.

At action 306, an indication that the digital unwrapping trigger has been met is provided. The indication may be provided directly by the sender device. For example, the sender device may log onto an interface provided by the order fulfillment system and select an interface option to indicate that the digital unwrapping trigger has been met. Although FIG. 3 describes the indication as being provided by the sender device, the digital unwrapping trigger may also be provided by another source, such as a third party source. Examples of various sources of the indication are described above with respect to the trigger data source 108 described with respect to FIG. 1. In some embodiments, the digital unwrapping trigger may be received as a plurality of events. For example, as the user progresses towards final satisfaction of the trigger, multiple individual events may establish progress towards the unwrapping trigger (e.g., as progressive milestone dates pass towards a final reveal date). These multiple individual events may trigger separate or sub-reveal operations, such as notifying the recipient of separate products, or providing the recipient with clues as to the identity of the final product.

At action 308, the order fulfillment system enables access to the identity of the product via the digital notification upon receiving the indication that the digital unwrapping trigger has been met. As described above, the order fulfillment system may modify web content associated with a link contained in the digital notification to allow the recipient to determine the identity of the product. In some embodiments, the order fulfillment system may send a follow-up message to the recipient, indicating that the trigger has been met. In some embodiments, the follow-up message may include the identity of the product.

At action 310, the recipient device may request the identity of the product associated with the digital notification. For example, the recipient may select a link from within the digital unwrapping trigger, or login to a web page with a code or user credentials supplied via the digital notification. At action 312, the recipient device may be provided with the identity of the product via the order fulfillment system. For example, the order fulfillment system may provide access to a webpage with an image of the product, a name of the product, or other information about the product.

At action 314, the order fulfillment system may initiate physical delivery of the product in response to the recipient being informed of the product identity. The order fulfillment system may determine that the user has been informed of the product identity by determining whether the recipient has viewed a webpage enabled in response to satisfying the digital unwrapping trigger.

FIG. 4 depicts a flow chart showing an exemplary process 400 for enabling identification of a product using a digital unwrapping trigger to enable a digital notification in accordance with some example embodiments. As described above, the order fulfillment system 102 may manage digital notifications to recipients of physical products to inform the recipient that they will be receiving a product, while ensuring that the recipient is not informed of the identity of the product until certain digital unwrapping triggers are satisfied. The process 400 describes one example of a process by which the order fulfillment may perform such functions.

At action 402, a purchase order is received for a physical product. As described above, the order fulfillment system may receive the purchase order via an e-commerce system, or from a computer node implementing an e-commerce system. Additionally or alternatively, the purchase order may be received via other methods, such as a telephone order or an order placed in-person by a sender using a retailer computer system. The purchase order may specify the particular product to be sent to the recipient, the identity and/or physical and digital addresses of the recipient, and one or more digital unwrapping triggers.

At action 404, the digital unwrapping trigger or triggers for the digital notification are configured according to any digital unwrapping triggers specified at action 404. These digital unwrapping triggers may determine under what circumstances functionality within the digital unwrapping trigger is enabled to allow the recipient to view the product ordered by the sender. In some embodiments, these digital unwrapping triggers may determine under what circumstances the notification is sent to the recipient in the first place. For example, the digital unwrapping trigger may specify that a digital unwrapping trigger identifying the product should be sent on a particular day (e.g., a birthday or holiday).

At action 406, a digital notification is sent to the recipient. As described above, the digital notification may be sent with certain functionality disabled, such as the functionality that allows the recipient to identify the product they are to receive. The digital notification may be sent to the recipient via any digital method as described above, including but not limited to an e-mail, a text message, or a social network message.

At action 408, an indication that the digital unwrapping trigger has been satisfied is received. The indication may be received from an internal system or an external system. For example, an internal clock may indicate that a particular date or time specified by the digital unwrapping trigger has occurred, an external computer node may indicate that the recipient has met certain criteria (e.g., a fitness goal, a weight loss goal, a grade point average goal), or a sender device may indicate that the user has satisfied the digital unwrapping trigger.

At action 410, identification of the product is enabled via the digital notification. As described above, the digital unwrapping trigger may enable the recipient of the product to use the digital notification to determine the identity of the product. Identification may be enabled, for example, by altering content associated with a link contained within the digital notification, by enabling the recipient to access a particular web page, or by sending a follow up digital notification containing the identity of the product.

Actions 412 and 414 describe optional steps for managing delivery of the physical products based on the digital notification. At action 412, the process 400 may determine whether the recipient has viewed the identity of the product via the digital notification (e.g., whether the recipient has visited the link associated with the digital notification after satisfying the digital unwrapping trigger). If the recipient has viewed the identity of the product, the process 400 may proceed to action 414. If the recipient has not viewed the identity of the product, the process 400 may stall at action 412 until the digital notification has been viewed, or until a period of time has passed, after which the process 400 may end with default processing, such as shipping the physical product after the period of time, or cancelling the shipment of the product.

At action 414, if the recipient has viewed the identity of the product via the digital notification, the process 400 may initiate shipment of the physical product. In this manner, the process 400 may control shipment of the physical product until after the recipient has been informed of the product shipment via the digital notification. In some embodiments, the process 400 may provide for shipment of the product based on criteria separate and distinct from the digital notification. For example, the process 400 may coordinate shipment of the product with a transmission date or time of the digital notification, to ensure that the physical product will arrive after the digital notification. In such circumstances, the process 400 may coordinate the dates of shipment and transmission of the digital notification, but the act of shipping the product may not be contingent on any action related to accessing or viewing the digital notification.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for managing electronic content identified by a link provided, via a network, by means of a digital notification, the digital notification configured to be provided in advance of a digital trigger being met, the link providing access to first electronic content and subsequently upon the digital trigger being met, providing access to second electronic content thereby providing access to all of the available electronic information, the apparatus comprising:
   a memory coupled to at least one processor; and
   the at least one processor configured to:
      receive, via a network, an order for a product, the order comprising a digital address of a recipient, at least one digital unwrapping trigger, and particular criteria that will satisfy the at least one digital unwrapping trigger;
      provide a digital notification to the recipient via an electronic communication to the digital address of the recipient, the digital notification comprising an invalid link, the invalid hyperlink remaining invalid until a time at which particular criteria that will satisfy a digital unwrapping trigger is met;
      receive an indication of a selection of the link;
      access a trigger data source to verify satisfaction of the at least one digital unwrapping trigger;
      receive an indication of the satisfaction of the at least one digital unwrapping trigger; and enable access to information identifying the identity of the product via the digital notification, wherein the enabling access comprises modifying web content associated with the link contained in the digital notification to display the information identifying the identity of the product.

2. The apparatus according to claim 1, wherein the processor is further configured to:
upon reception of the indication of the selection of the link, and subsequent reception of an indication that the at least one digital unwrapping trigger has not been met, cause display of one or more portions of the information identifying the identity of the product, wherein the displayed one or more portions progressively increase as progression is made toward the satisfaction of the digital unwrapping trigger;
enable access to the identity of the product via the digital notification upon receiving the indication that the digital unwrapping trigger has been met, wherein the enabling access comprises modifying web content associated with a link contained in the digital notification to allow the recipient to determine the identity of the product.

3. The apparatus according to claim 1, wherein the processor is further configured to:
provide the digital notification to the recipient in response the satisfaction of the at least one digital unwrapping trigger.

4. The apparatus according to claim 1, wherein the processor is further configured to:
provide the digital notification to the recipient prior to the satisfaction of the at least one digital unwrapping trigger.

5. The apparatus according to claim 1, wherein the processor is further configured to:
maintain the invalidity of the hyperlink until the satisfaction of the digital unwrapping trigger; and
upon determination of the satisfaction of the digital unwrapping trigger, populate content at an address of the link with the information indicating the identity of the product.

6. The apparatus according to claim 1, wherein the processor is further configured to:
coordinate a physical delivery of the product such that the physical delivery occurs after delivery of the digital notification.

7. The apparatus according to claim 1, wherein the processor is further configured to:
receive an indicator that the recipient has viewed the digital notification; and
in response to receiving the indicator, initiate the physical delivery of the physical product.

8. A method for managing electronic content identified by a link provided, via a network, by means of a digital notification, the digital notification configured to be provided in advance of a digital trigger being met, the link providing access to first electronic content and subsequently upon the digital trigger being met, providing access to second electronic content thereby providing access to all of the available electronic information, the method comprising:
receiving, via a network, an order for a product, the order comprising a digital address of a recipient, at least one digital unwrapping trigger, and particular criteria that will satisfy the at least one digital unwrapping trigger;
providing a digital notification to the recipient via an electronic communication to the digital address of the recipient, the digital notification comprising an invalid link, the invalid hyperlink remaining invalid until a time at which particular criteria that will satisfy a digital unwrapping trigger is met;
receiving an indication of a selection of the link;
accessing a trigger data source to verify satisfaction of the at least one digital unwrapping trigger;
receiving an indication of the satisfaction of the at least one digital unwrapping trigger; and
enabling access to information identifying the identity of the product via the digital notification, wherein the enabling access comprises modifying web content associated with the link contained in the digital notification to display the information identifying the identity of the product.

9. The method according to claim 8, further comprising:
upon reception of the indication of the selection of the link, and subsequent reception of an indication that the at least one digital unwrapping trigger has not been met, causing display of one or more portions of the information identifying the identity of the product, wherein the displayed one or more portions progressively increase as progression is made toward the satisfaction of the digital unwrapping trigger;
enabling access to the identity of the product via the digital notification upon receiving the indication that the digital unwrapping trigger has been met, wherein the enabling access comprises modifying web content associated with a link contained in the digital notification to allow the recipient to determine the identity of the product.

10. The method according to claim 8, further comprising:
providing the digital notification to the recipient in response the satisfaction of the at least one digital unwrapping trigger.

11. The method according to claim 8, further comprising:
providing the digital notification to the recipient prior to the satisfaction of the at least one digital unwrapping trigger.

12. The method according to claim 8, further comprising:
maintaining the invalidity of the hyperlink until the satisfaction of the digital unwrapping trigger; and
upon determination of the satisfaction of the digital unwrapping trigger, populating content at an address of the link with the information indicating the identity of the product.

13. The method according to claim 8, further comprising:
coordinating a physical delivery of the product such that the physical delivery occurs after delivery of the digital notification.

14. The method according to claim 8, further comprising:
receiving an indicator that the recipient has viewed the digital notification; and
in response to receiving the indicator, initiating the physical delivery of the physical product.

15. A non-transitory computer readable storage medium for managing electronic content identified by a link provided, via a network, by means of a digital notification, the digital notification configured to be provided in advance of a digital trigger being met, the link providing access to first electronic content and subsequently upon the digital trigger being met, providing access to second electronic content thereby providing access to all of the available electronic information, the non-transitory computer readable storage medium comprising instructions that, when executed by a processor, cause the processor to:
receive, via a network, an order for a product, the order comprising a digital address of a recipient, at least one digital unwrapping trigger, and particular criteria that will satisfy the at least one digital unwrapping trigger;

provide a digital notification to the recipient via an electronic communication to the digital address of the recipient, the digital notification comprising an invalid link, the invalid hyperlink remaining invalid until a time at which particular criteria that will satisfy a digital unwrapping trigger is met;

receive an indication of a selection of the link;

access a trigger data source to verify satisfaction of the at least one digital unwrapping trigger;

receive an indication of the satisfaction of the at least one digital unwrapping trigger; and enable access to information identifying the identity of the product via the digital notification, wherein the enabling access comprises modifying web content associated with the link contained in the digital notification to display the information identifying the identity of the product.

16. The computer readable medium according to claim 15, wherein the non-transitory computer readable storage medium further comprises instructions that, when executed by a processor, cause the processor to:

upon reception of the indication of the selection of the link, and subsequent reception of an indication that the at least one digital unwrapping trigger has not been met, cause display of one or more portions of the information identifying the identity of the product, wherein the displayed one or more portions progressively increase as progression is made toward the satisfaction of the digital unwrapping trigger;

enable access to the identity of the product via the digital notification upon receiving the indication that the digital unwrapping trigger has been met, wherein the enabling access comprises modifying web content associated with a link contained in the digital notification to allow the recipient to determine the identity of the product.

17. The computer readable medium according to claim 15, wherein the non-transitory computer readable storage medium further comprises instructions that, when executed by a processor, cause the processor to:

provide the digital notification to the recipient in response the satisfaction of the at least one digital unwrapping trigger.

18. The computer readable medium according to claim 15, wherein the non-transitory computer readable storage medium further comprises instructions that, when executed by a processor, cause the processor to:

provide the digital notification to the recipient prior to the satisfaction of the at least one digital unwrapping trigger.

19. The computer readable medium according to claim 15, wherein the non-transitory computer readable storage medium further comprises instructions that, when executed by a processor, cause the processor to:

maintain the invalidity of the hyperlink until the satisfaction of the digital unwrapping trigger; and upon determination of the satisfaction of the digital unwrapping trigger, populat content at an address of the link with the information indicating the identity of the product.

20. The computer readable medium according to claim 15, wherein the non-transitory computer readable storage medium further comprises instructions that, when executed by a processor, cause the processor to:

coordinate a physical delivery of the product such that the physical delivery occurs after delivery of the digital notification.

21. The computer readable medium according to claim 15, wherein the non-transitory computer readable storage medium further comprises instructions that, when executed by a processor, cause the processor to:

receive an indicator that the recipient has viewed the digital notification; and in response to receiving the indicator, initiate the physical delivery of the physical product.

* * * * *